United States Patent Office
3,500,370
Patented Mar. 10, 1970

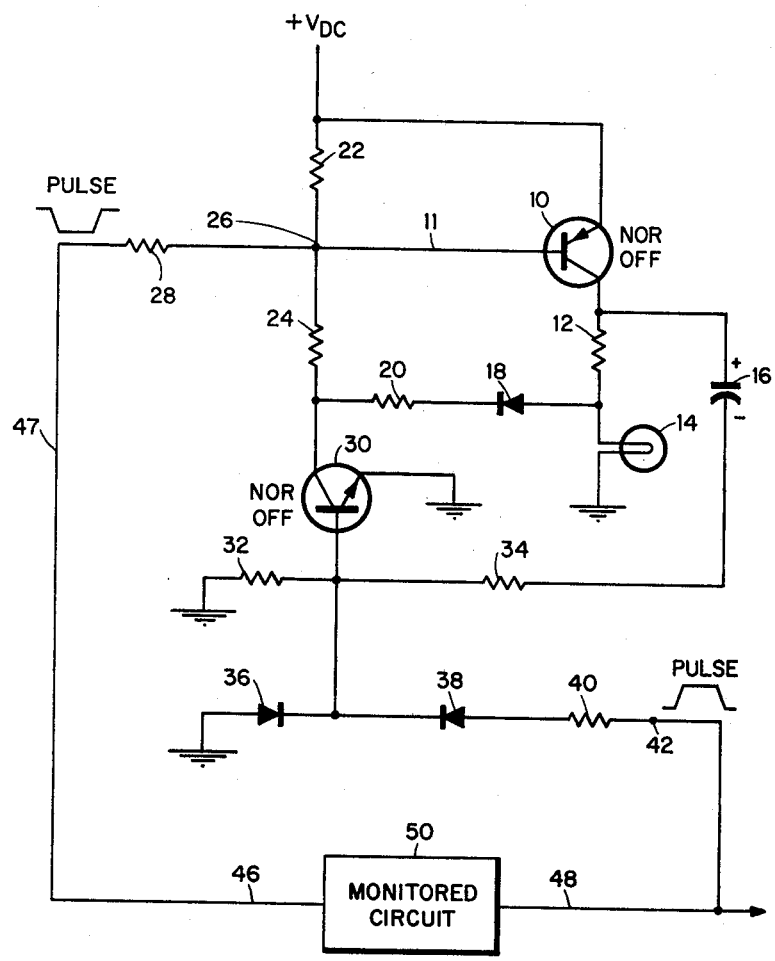

3,500,370
COMPLEMENTARY ONE-SHOT INDICATOR CIRCUIT
Amram Rasiel and William M. Henebry, Marblehead, Mass., assignors to EG & G Inc., Bedford, Mass., a corporation of Massachusetts
Filed Apr. 3, 1967, Ser. No. 627,912
Int. Cl. G08b 5/36
U.S. Cl. 340—248                   1 Claim

ABSTRACT OF THE DISCLOSURE

A lamp indicator circuit having two transistors connected as a monostable multivibrator with a clamping circuit connected between the transistor outputs and a lamp connected at the output of one of the transistors.

BACKGROUND OF THE INVENTION

Numerous lamp indicator circuits have been devised for use in electronic equipment. In such circuits, as in the present invention, nonillumination of the lamp usually indicates that the circuit being monitored is not operating. Illumination of the lamp indicates that certain conditions exist. When it is desired to determine if one of two conditions exists, other than nonoperativeness, usually two lamps with associated indicating circuitry are used. We have, on the other hand, invented an indicator circuit utilizing only one lamp for indicating either of two conditions existing in a circuit that has associated with it circuitry for producing output pulses at two terminals corresponding to the conditions being monitored. If the one condition exists in the monitored circuit the lamp glows at partial intensity easily distinguishable by the eye from the full intensity obtained when the other circuit condition exists.

INVENTION SUMMARY

The basic circuit being monitored must have two terminals at which pulses can appear each indicating a condition of the circuit. A constraint on the monitored circuit is that it not produce both pulses at the same time. Obviously, those skilled in the electronic art will readily be able to devise pulse generator circuits that can be connected to a circuit to be monitored. Further, steering and logic circuits may be devised to enable the indicator circuit to monitor the condition preferred if both conditions and their corresponding pulses exist simultaneously. The two pulse outputs are connected to a monostable multivibrator circuit having two transistors so connected that the transistors are not conducting in the stable state. The pulse outputs are connected to the bases of the transistors. A series connected resistor and diode clamping circuit is connected between the transistor outputs. In operation, when a pulse, or a plurality of pulses, appears at the first output it is applied to the base of the first transistor, turning on both transistors. The output current of the second transistor charges the capacitor in the RC feedback loop and divides between the resistor-diode feedback circuit and the lamp, causing the lamp to glow at partial intensity. When the pulse terminates, the charging capacitor maintains the transistors conducting for a short period of time and then discharges through the lamp, maintaining the glow at partial intensity long enough to be detected by the eye. This indicates that a first condition exists in the circuit being monitored.

On the other hand, if a pulse, or pulses, appears at the second output of the circuit being monitored, it is applied to the base of the second transistor, turning it on and causing current of full intensity to flow through the lamp.

The detailed operation and features of the present invention will now be described with reference to the drawing.

DESCRIPTION

Transistors 10 and 30 are shown interconnected as a monostable multivibrator adapted to monitor conditions in circuit 50. To facilitate understanding monitored circuit 50 is illustrated as having two outputs 46 and 48, with pulses at output 46 being negative going and pulses at output 48 positive going. It will be apparent that the polarities depicted are not constraints on the scope of the invention because transistor types and various polarities can be easily changed.

When no pulses appear at outputs 46 and 48 monitored circuit 50 normally would be considered to be not operative. Transistors 10 and 30, in this event, do not conduct and there is no possible path for current to flow through lamp 14. Diode 18, whose anode connects to one side of lamp 14 and whose cathode connects to the positive voltage supply, $+V_{DC}$, by way of resistors 20, 24 and 22, blocks current flow to lamp 14, the other side of which is grounded. Nor can current flow to lamp 14 by way of resistor 12 because transistor 10 is nonconducting.

A first condition exists in monitored circuit 50 when positive going pulses appear at output 48. These may, for example, indicate proper operation of monitored circuit 50. These pulses are applied at input 42 of the indicator circuit of the present invention. They may have varied repetition rates and different pulse widths. They are applied to the base of transistor 30 through the series connection of resistor 40 and diode 38. The cathode of diode 38 connects to the base of transistor 30 the emitter of which is grounded, one side of grounded resistor 32 and the cathode of diode 36, the anode of which likewise is grounded. Resistor 40 limits the base current of transistor 30 when a positive going pulse is applied at input 42, while resistor 32 provides bias for transistor 30. Diode 36 is normally back-biased when positive pulses are applied, but if a negative pulse should be applied diode 36 forward-biases, clamping the base of transistor 30 at a small negative voltage thereby protecting its base emitter junction.

A positive pulse at input 42 is passed by resistor 40 and diode 38 to the base of transistor 30, turning it on. The collector of transistor 30 connects through resistor 24 to node 26 which connects through resistor 22 to positive voltage supply $+V_{DC}$, through conductor 11 to the base of transistor 10 and through resistor 28 and conductor 47 to output 46 of monitored circuit 50. The emitter of transistor 10 also connects to $+V_{DC}$. When transistor 30 starts conducting its collector voltage decreases rapidly toward ground and the voltage at node 26 decreases from $+V_{DC}$ thereby forward biasing the base-emitter junction of transistor 10 and turning it on.

The collector of transistor 10 connects through resistor 12 and lamp 14 to ground and through capacitor 16 and resistor 34 to the base of transistor 30. A clamping series circuit of resistor 20 and diode 18 is illustrated with the anode of diode 18 connected to the ungrounded side of lamp 14 and one terminal of resistor 20 connected to the collector of transistor 30.

With transistors 10 and 30 both conducting capacitor 16 immediately begins to charge and the current through resistor 12 divides with one portion flowing through the series clamping circuit of diode 18 and resistor 20 to the collector of transistor 30 which essentially is at ground as long as transistor 30 conducts; while the other portion flows through lamp 14 to ground. The circuit constants are so selected that lamp 14 glows at partial intensity. If the pulse at input 42 is of short duration on the order of microseconds, for example, and has terminated, capacitor 16, which continues to charge, maintains transistors 10 and 30 conducting until it can no longer furnish sufficient current at the base of transistor 30 to maintain it conducting. At that time transistors 10 and 30 cease conducting and capacitor 16 discharges through lamp 14. Circuit values are so selected that the charge and discharge time constants are sufficiently long for lamp 14 to glow at partial intensity a sufficient time for the eye to detect. Note that if a series of short duration pulses is applied having time intervals therebetween less than the discharge time constant the effect on the eye is the same as if one long pulse were applied.

If a negative-going pulse, or plurality of negative-going pulses, is applied from output 46 through conductor 47 and resistor 28 to node 26, another condition exists in monitored circuit 50. Resistor 28 limits the base current of transistor 10 when a negative pulse is applied via conductor 47. This pulse heavily saturates transistor 10 causing it to conduct. However, after capacitor 16 is charged transistor 30 does not conduct and no current flows through the series clamping circuit of diode 18 and resistor 20. All the output current of transistor 10 charges capacitor 16 and flows through lamp 14 causing it to glow at full intensity, indicating that another condition exists in circuit 50.

We claim:
1. An indicator circuit for indicating the presence of output pulses at first and second terminals, comprising:
   first and second normally nonconducting transistors, of opposite types, each having a base, emitter and collector;
   a source of operating potential connected to the base and emitter of the second transistor;
   a first resistor, a first diode and a second resistor in series circuit connected between the collectors of the first and second transistors;
   a reference potential connected to the emitter of the first transistor;
   a lamp connected between the junction of the first resistor and the anode of the first diode and the reference potential;
   a capacitor, a third resistor, and a fourth resistor in series circuit connected between the collector of the second transistor and the reference potential, with the base of the first transistor connetced to the junction of the third and fourth resistors;
   a fifth resistor and a second diode in series circuit connecting the output pulses of the first terminal to the base of the first transistor to drive the first and second transistors into conduction during the presence of such output pulses, the emitter-collector current flowing through the conducting second transistor charging the capacitor and flowing through the first resistor and dividing between the first diode and second resistor series circuit and the lamp causing the lamp to glow at partial brilliance; and
   a sixth resistor connecting the output pulses of the second terminal to the base of the second transistor and the collector of the first transistor to drive only the second transistor into conduction during the presence of such output pulses, the emitter-collector current flowing through the conducting second transistor charging the capacitor and flowing through the first resistor and only the lamp causing the lamp to glow at full brilliance.

References Cited

UNITED STATES PATENTS 3,109,105  10/1963  Samuel _____ 307—273 XR

JOHN W. CALDWELL, Primary Examiner

DANIEL MYER, Assistant Examiner

U.S. Cl. X.R.

307—273, 288